US012592482B2

(12) United States Patent
Fang et al.

(10) Patent No.: US 12,592,482 B2
(45) Date of Patent: Mar. 31, 2026

(54) HOLOGRAPHIC ANTENNA WITH ISOLATION COMPONENTS AND ELECTRONIC DEVICE

(71) Applicants: Beijing BOE Technology Development Co., Ltd., Beijing (CN); BOE TECHNOLOGY GROUP CO., LTD., Beijing (CN)

(72) Inventors: Jia Fang, Beijing (CN); Feng Qu, Beijing (CN); Jian Xu, Beijing (CN); Chen Xu, Beijing (CN)

(73) Assignees: Beijing BOE Technology Development Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 173 days.

(21) Appl. No.: 18/280,144

(22) PCT Filed: Oct. 26, 2022

(86) PCT No.: PCT/CN2022/127524

§ 371 (c)(1),
(2) Date: Sep. 1, 2023

(87) PCT Pub. No.: WO2024/087043

PCT Pub. Date: May 2, 2024

(65) Prior Publication Data

US 2025/0023246 A1 Jan. 16, 2025

(51) Int. Cl.
*H01Q 1/52* (2006.01)
*H01Q 3/44* (2006.01)
*H01Q 21/00* (2006.01)

(52) U.S. Cl.
CPC ............... *H01Q 1/523* (2013.01); *H01Q 3/44* (2013.01); *H01Q 21/0043* (2013.01)

(58) Field of Classification Search
CPC .......... H01Q 1/52; H01Q 1/521; H01Q 1/523; H01Q 3/44; H01Q 3/443; H01Q 21/0037;
(Continued)

(56) References Cited

U.S. PATENT DOCUMENTS

2014/0266946 A1* 9/2014 Bily ......................... H01Q 3/22
343/771
2015/0222014 A1 8/2015 Stevenson et al.
2015/0288063 A1 10/2015 Johnson et al.
2018/0040960 A1 2/2018 Johnson et al.

FOREIGN PATENT DOCUMENTS

CN 106961008 A 7/2017
CN 109149108 A 1/2019
(Continued)

OTHER PUBLICATIONS

Xiu et al., "Design and implementation of one-dimensional liquid crystal holographic coding phased array antenna," Chinese Journal of Radio Science, Sep. 27, 2021, DOI: 10.12265/j.cjors. 2021162, pp. 1-9, English Abstract.
(Continued)

*Primary Examiner* — Robert Karacsony
(74) *Attorney, Agent, or Firm* — HOUTTEMAN LAW LLC

(57) ABSTRACT

A holographic antenna includes first and second dielectric substrates, a waveguide structure, a radiation layer, a plurality of switch units and a plurality of isolation components; the first dielectric substrate is on a waveguide port of the waveguide structure; the radiation layer is on a side of the first dielectric substrate away from the waveguide structure, and has a plurality of slits; the second dielectric substrate is on a side of the radiation layer away from the first dielectric substrate; the switch units and the isolation components are between the second dielectric substrate and the radiation layer; orthographic projections of each isolation component
(Continued)

and each slit on the first dielectric substrate are first and second patterns, respectively; at least one first pattern is between two adjacent second patterns, and a first distance is between the second pattern and the first pattern closest to the second pattern.

17 Claims, 3 Drawing Sheets

(58) Field of Classification Search
CPC .. H01Q 21/0043; H01Q 21/005; H01Q 21/06; H01Q 21/061; H01Q 21/064; H01Q 23/00
See application file for complete search history.

(56) References Cited

FOREIGN PATENT DOCUMENTS

| | | | |
|---|---|---|---|
| CN | 109478715 | A | 3/2019 |
| CN | 110574236 | A | 12/2019 |
| CN | 111682317 | A | 9/2020 |
| CN | 112640213 | A | 4/2021 |
| CN | 115136410 | A | 9/2022 |
| JP | 2011077608 | A | 4/2011 |

OTHER PUBLICATIONS

China Patent Office, First Office Action, Feb. 5, 2026, for corresponding CN application No. 202280003783.1.

* cited by examiner

HOLOGRAPHIC ANTENNA WITH ISOLATION COMPONENTS AND ELECTRONIC DEVICE

TECHNICAL FIELD

The present disclosure relates to the field of communication technology, and particularly to a holographic antenna and an electronic device.

BACKGROUND

An antenna is used as a terminal device of most wireless communication systems, and an operation performance of the antenna is crucial to an overall performance of the system. With the development of technology, the requirements on the performance of the antenna are higher and higher. In addition to high requirements on conventional indicators such as gain, polarization, and the like, the antenna is often required to have characteristics such as low profile, light weight, easy conformal, or the like. Although a reflector antenna, a phased array antenna, a lens antenna, and the like can realize high gain, they have obvious disadvantages. For example, the reflector antenna is required to provide a space irradiation source, so that the profile thereof is greatly increased: a feeding network of the phased array antenna is extremely complex, difficult to design and high in cost; and the lens antenna itself has a higher profile, which is further increased in a case where the irradiation source is added to the lens antenna. The holographic antenna as a high-gain antenna can simultaneously meet the requirements of low profile, light weight and the like, thereby being very suitable for the current application background and having full development potential.

SUMMARY

The present disclosure is directed to at least one of the problems in the related art, and provides a holographic antenna and an electronic device.

In a first aspect, an embodiment of the present disclosure provides a holographic antenna, including a first dielectric substrate, a second dielectric substrate, a waveguide structure, a radiation layer and a plurality of switch units: where the first dielectric substrate is on a waveguide port of the waveguide structure: the radiation layer is on a side of the first dielectric substrate away from the waveguide structure, and the radiation layer is provided with a plurality of slits: the second dielectric substrate is on a side of the radiation layer away from the first dielectric substrate: the plurality of switch units are between the second dielectric substrate and the radiation layer, and are in one-to-one correspondence with the plurality of slits:

where the holographic antenna further includes a plurality of isolation components between the second dielectric substrate and the radiation layer: an orthographic projection of each of the plurality of isolation components on the first dielectric substrate is a first pattern, and an orthographic projection of each of the plurality of slits on the first dielectric substrate is a second pattern: at least one of the first patterns is between two of the second patterns adjacent to each other, and a first distance is between the second pattern and the first pattern closest to the second pattern.

The holographic antenna further includes a plurality of support components between the second dielectric substrate and the radiation layer: the plurality of support components are in one-to-one correspondence with the plurality of isolation components; and each of the plurality of isolation components is on a side of the support component corresponding to the isolation component, close to the second dielectric substrate.

The support component includes a conductive material.

The plurality of first patterns and the plurality of second patterns alternate with each other.

The plurality of slits are arranged side by side in a first direction, each of the plurality of isolation components includes a plurality of sub-isolators arranged side by side and spaced apart from each other in the first direction.

Each of the plurality of slits extends in a second direction, a length direction of each of the plurality of sub-isolators is the second direction.

The holographic antenna further includes a plurality of support components between the second dielectric substrate and the radiation layer, each of the plurality of support components includes a first sub-support and a second sub-support, and the isolation component is between the first sub-support and the second sub-support.

Each of the plurality of slits extends in a second direction, and each of the plurality of isolation components includes a plurality of sub-isolators arranged side by side and spaced apart from each other in the second direction.

A second distance is between any two of plurality of sub-isolators adjacent to each other in the isolation component; and a distance value of the second distance is less than or equal to 0.2 wavelength.

Each of the plurality of slits extends in a second direction, and for any one of the second patterns, two of the first patterns are on both sides of the second pattern extending in the second direction, respectively.

For any one of the second patterns, two of the first patterns at both sides of the second pattern extending in the second direction are a first isolation pattern and a second isolation pattern, respectively: the first isolation pattern has a first edge opposite to the second pattern, the closer a position on the first edge is to a midpoint of the first edge, the greater a distance between the position and the second pattern is; and/or, the second isolation pattern has a second edge opposite to the second pattern, the closer a position on the second edge is to a midpoint of the second edge, the greater a distance between the position and the second pattern is.

For any one of the second patterns, two of the first patterns on both sides of the second pattern extending in the second direction are symmetrical to each other, taking a straight line passing through a center of the second pattern and extending in the second direction as a symmetry axis.

The two of the first patterns each have a first edge opposite to the second pattern, and the first edge is an arc or a polyline.

For any one of the second patterns, two of the first patterns on both sides of the second pattern extending in the second direction are centro-symmetrical to each other, taking a center of the second pattern as a rotation center.

The two of the first patterns each have a first part and a second part: the first part extends in the second direction, and the second part is connected to one end of the first part and directed toward the second pattern.

A distance value of the first distance is not less than 0.1 medium wavelength.

Each of the plurality of switch units includes a first electrode on a side of the first dielectric substrate close to the second dielectric substrate, a second electrode on the second dielectric substrate, and a liquid crystal layer between the first electrode and the second electrode; and the radiation layer also serves as the first electrode: the second electrodes of the plurality of switch units are in one-to-one correspondence with the plurality of slits.

The switch unit further includes a control transistor: a drain of the control transistor is electrically connected to the second electrode, a source of the control transistor is electrically connected to a driving voltage line, and a gate of the control transistor is electrically connected to a control line.

The isolation component is in the same layer as the second electrode.

In a second aspect, an embodiment of the present disclosure provides an electronic device, which includes any one of the holographic antennas described above.

DETAIL DESCRIPTION OF EMBODIMENTS

Figure 1:
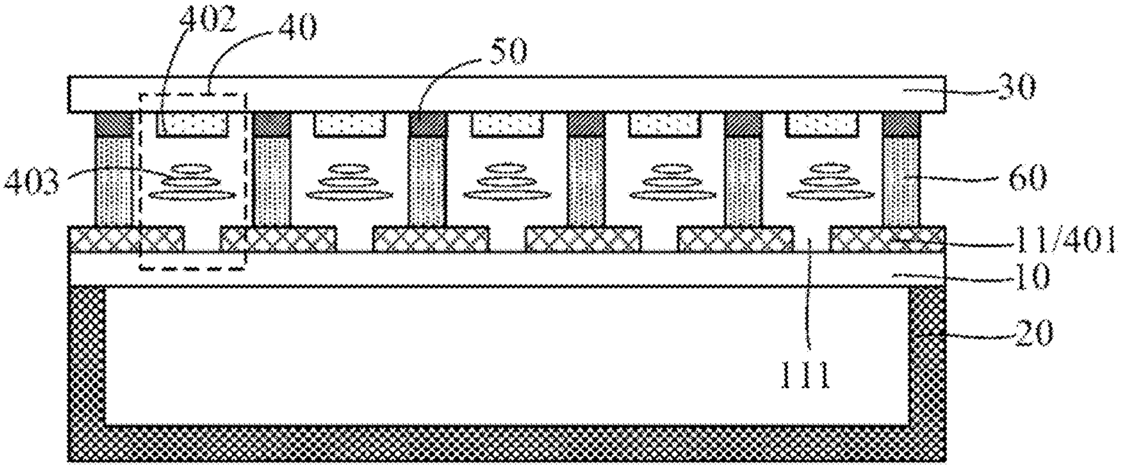
FIG. 1 is a sectional view of a holographic antenna (a first example) according to an embodiment of the present disclosure.

In order enable one of ordinary skill in the art to better understand the technical solutions of the present disclosure, the present disclosure is further described in detail with reference to the accompanying drawings and the detailed description below.

Unless defined otherwise, technical or scientific terms used herein shall have the ordinary meaning as understood by one of ordinary skill in the art to which the present disclosure belongs. The words "first", "second", and the like used in the present disclosure do not denote any order, quantity, or importance, but rather distinguish one element from another. Likewise, the word "a", "an", or "the" or the like does not denote a limitation of quantity, but rather denotes the presence of at least one. The word "comprising" or "comprises", or the like, means that an element or item preceding the word includes the element or item listed after the word and its equivalent, but does not exclude other elements or items. The word "connected" or "coupled" or the like is not restricted to physical or mechanical connections, but may include electrical connections, whether direct or indirect. "Upper", "lower", "left", "right", and the like are used only to indicate relative positional relationships, and when an absolute position of an object being described is changed, the relative positional relationships may also be changed accordingly.

The concept of the holographic antenna is derived from the optical holographic principle, which is that an interference surface is formed by interference of a target wave and a reference wave, and then the interference surface is irradiated by the reference wave to perform inversion to obtain the target wave. Due to the presence of metamaterial, it is possible to implement the holographic antenna in the microwave band. The holographic antenna system includes only a holographic surface and a feeding source, therefore the structure is very simple. The feeding source generally employs a horn antenna, a monopole antenna or a slot antenna, and does not need a complex feeding network. In order to reduce the profile, the monopole antenna or the slot antenna is often used as a feeding source. The holographic surface mainly includes a dielectric substrate and a metal patch array which is periodically distributed, and the holographic surface is simple to process and low in cost. In a design process of the holographic surface, the required holographic surface can be obtained by merely calculating an interference field expression formed after interference between a target field and a reference field, and designing the distribution of the metal patches according to the interference field expression, and the design process is very simple. If different target waves are obtained, the target field expression is substituted into the process again. This simplicity and flexibility in design is another great advantage of the holographic antenna. In addition, the holographic antenna has the characteristic of easy conformal, and the performance of the holographic antenna is not greatly influenced when the holographic antenna is attached to curved surfaces such as a spherical surface, a cylindrical surface, or the like, so that the holographic antenna is very suitable for being applied to an object such as am aircraft, a missile guidance head, or the like.

Reconfigurability is a new requirement on the modern antenna, which can greatly improve reusability of the antenna, and reduce the cost and the complexity of the antenna system. For example, a frequency reconfigurable antenna can operate at a plurality of frequency points: a plurality of polarization modes can be realized by a polarization reconfigurable antenna; and a wave beam reconfigurable antenna can be switched among a plurality of wave beam directions and has the function of a phased scanning array. If the holographic antenna employs a reconfigurable unit and has the reconfigurability, a plurality of functions such as beam scanning, multi-beam synthesis, polarization reconfiguration, and the like can be realized on the holographic surface, and the application potential is huge. In some examples, in a holographic antenna, a switch unit corresponding to a slit is arranged on a side of the radiation layer with the slit, away from a waveguide structure, and the reconstruction of the wave beam can be realized by controlling the switch states of the switch units at positions of the respective slits.

However, since the basic principle of the holographic antenna is to equate a simulated interference pattern to the discretized switch units, it is necessary to arrange antenna units more densely as possible, usually much less than 0.5 free wavelength, in order to restore the simulated interference pattern as much as possible. Such a close arrangement causes very severe coupling between surface waves of the units, resulting in a deteriorated directional pattern. Furthermore, the surface waves cause losses and deteriorate the antenna efficiency.

In view of the above problems, the embodiments of the present disclosure provide the following technical solutions.

Figure 2:
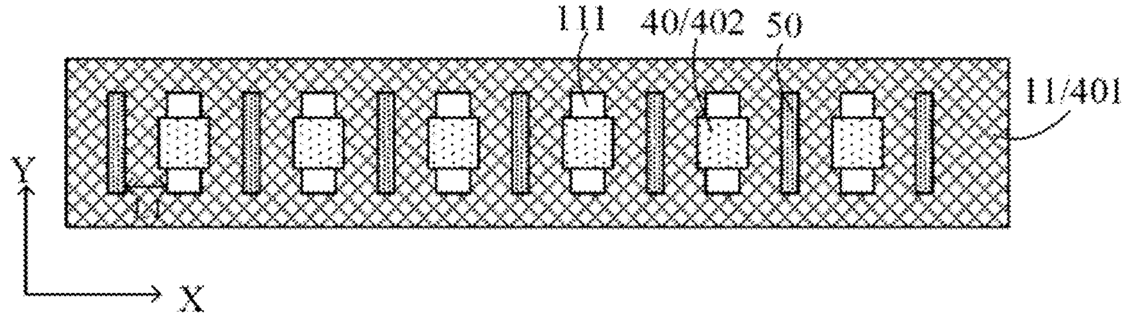
FIG. 2 is a plan view of the holographic antenna shown in FIG. 1.

FIG. 1 is a cross-sectional view of a holographic antenna according to an embodiment of the present disclosure; and FIG. 2 is a top view of the holographic antenna shown in FIG. 1. In a first aspect, as shown in FIGS. 1 and 2, the present disclosure provides a holographic antenna, which includes a first dielectric substrate 10, a second dielectric substrate 30, a waveguide structure 20, a radiation layer 11, a plurality of switch units 40, and a plurality of isolation components 50. The first dielectric substrate 10 is arranged on a waveguide port of the waveguide structure 20, the radiation layer 11 is arranged on a side of the first dielectric substrate 10 away from the waveguide structure 20, the second dielectric substrate 30 is arranged on a side of the first radiation layer 11 away from the first dielectric substrate 10, with a certain interval between the second dielectric substrate 30 and the radiation layer 11, and the plurality of switch units 40 and the plurality of isolation components 50 are arranged between the second dielectric substrate 30 and the radiation layer 11.

In an embodiment of the present disclosure, a plurality of slits 111 in the radiation layer 11 may be arranged side by side in a first direction X, and the switch units 40 are arranged in one-to-one correspondence with the slits 111. The isolation component 50 may be arranged on the first dielectric substrate 10, and may alternatively be arranged on the radiation layer 11. An orthographic projection of the isolation component 50 on the first dielectric substrate 10 is a first pattern, and an orthographic projection of the slit 111 on the first dielectric substrate 10 is a second pattern. At least one first pattern is arranged between two adjacent second patterns, and a first distance is arranged between the second pattern and the first pattern closest to the second pattern. That is, at least one isolation component 50 is correspondingly arranged at a position between the slits 111 adjacent to each other.

In an embodiment of the present disclosure, the holographic antenna may be divided into a plurality of antenna units, each of which includes one slit 111 in the radiation layer 11 and the switch unit 40 corresponding to the slit 111. A microwave signal received by the waveguide structure 20 is radiated through the slit 111 in the radiation layer 11, and a direction of the wave radiated from each antenna unit is realized by controlling the on-off state of each switch unit 40, thereby realizing the shaping of the wave beam radiated from the holographic antenna. In particular, at least one isolation component 50 is correspondingly arranged at a position between the slits 111 adjacent to each other in the embodiment of the present disclosure, that is, at least one isolation component 50 is correspondingly arranged at a position between the antenna units adjacent to each other, and the isolation component 50 can effectively isolate the mutual coupling between the adjacent antenna units, which is beneficial to improving the isolation between the adjacent antenna units.

In some examples, the switch unit 40 in embodiment of the present disclosure includes, but is not limited to, a liquid crystal switch, a PIN diode, a varactor, a MEMS switch, or the like.

In a case where the switch unit 40 is a PIN diode or a varactor, the PIN diode or the varactor may be integrated with the slit 111, so as to realize capability of regulating a binary amplitude or a continuous amplitude. For example, in a case where the switch unit 40 employs a PIN diode, an input of a bias voltage to the PIN diode is controlled, thereby the forward/reverse bias of the PIN diode is controlled. When the slit 111 is required to be in an on-state, the bias voltage input to the PIN diode is greater than the conduction threshold value of the PIN diode, and the PIN diode is turned on; when the slit 111 is required to be in an off-state, the bias voltage input to the PIN diode is less than the conduction threshold of the PIN diode, and the PIN diode is turned off.

In a case where the switch unit 40 is an MEMS switch, the second dielectric substrate 30 is a flexible substrate, patch electrodes are arranged on the flexible substrate and are in one-to-one correspondence with the slits 111, and in this case, a distance between the patch electrode and the slit 111 is adjusted under a force of an electric field by applying a voltage to the patch electrode 34, so that the radiation amplitude of the radio frequency signal is continuously adjusted.

In an embodiment of the present disclosure, it is taken as an example only that the switch unit 40 is a liquid crystal switch. Referring to FIG. 1, the liquid crystal switch includes a first electrode 401 arranged on the first dielectric substrate 10, a second electrode 402 arranged on the second dielectric substrate 30, and a liquid crystal layer 403 arranged between the first electrode 401 and the second electrode 402. In one example, the radiation layer 11 may also serve as the first electrode 401 of the liquid crystal switch. In one example, the liquid crystal layer 403 of each switch unit 40 is common shared, that is, the liquid crystal layers 403 of all the switch unit 40 are connected into a one-piece structure. An orthographic projection of the second electrode 402 of each switch unit 40 on the first dielectric substrate 10 overlaps an orthographic projection of the slit 111 corresponding to the second electrode 402 on the first dielectric substrate 10. For example, the orthographic projection of the second electrode 402 on the first dielectric substrate 10 is a fourth pattern, which spans over the width of one second pattern. For any one of the switch units 40, after a driving voltage is applied to the second electrode 402, an electric field is formed between the first electrode 401 and the radiation layer 11, so that liquid crystal molecules are deflected, dielectric constant of the liquid crystal molecules is changed, resonant frequency is changed, and an emitting direction of the microwave signal is adjusted.

Furthermore, each of the switch units 40 includes not only the above-described structure but also a control transistor, which has a drain electrically connected to the second electrode 402, a source electrically connected to a driving voltage line, and a gate connected to a control signal line. In this case, the voltage applied to the second electrode 402 can be controlled by controlling the on-off of the control transistor. Furthermore, the gate of the control transistor of each switch unit 40 is electrically connected to a control signal line, and the on-off state of each switch unit 40 can be controlled by only controlling the control voltage written to the driving voltage line of the control transistor. The connection manner is simple in wiring and easy to realize. In addition, the reduced number of control lines facilitates the arrangement of the isolation components 50, providing more space for arranging the isolation components 50.

Furthermore, in a case where the isolation component 50 is arranged on the second dielectric substrate 30, the second dielectric substrate 30 may be arranged in the same layer and made of the same material as the second electrode 402 of each switch unit 40. That is, the isolation component 50 and the second electrode 402 may be formed in one process, without increasing the process cost and the overall thickness of the holographic antenna.

In some examples, an orthographic projection of the isolation component 50 on the first dielectric substrate 10 is a first pattern, and an orthographic projection of the slit 111 on the first dielectric substrate 10 is a second pattern, where a first distance between the second pattern and the first pattern nearest to the second pattern is a quarter of the dielectric wavelength. The reason for this arrangement is to ensure that the microwave signal radiated from the slit 111 can exit without being affected by the isolation component 50. Since the first distance between the second pattern and the nearest first pattern is a quarter of the dielectric wavelength, in this case, it is necessary to select glass substrates with dielectric constants as high as possible as the first dielectric substrate 10 and the second dielectric substrate 30. Preferably, glass substrates with dielectric constants of 4 to 16 are selected. The high dielectric constant of the glass substrate is favorable for the antenna to maintain the narrowband characteristic, so that the switching ratio of the antenna is increased, and the control on switching of the switch unit 40 in the antenna unit under different wave beams is more favorable.

Alternatively, if the distance between the antenna units does not satisfy the requirement that the first distance between the second pattern and the first pattern nearest to the second pattern is a quarter of the dielectric wavelength, then the first distance between the second pattern and the nearest first pattern nearest to the second pattern should be not less than 0.1 dielectric wavelength, to ensure the radiation performance of the antenna.

In some examples, the slit 111 in the radiation layer 11 may be any of a rectangular slit, an oval slit, an L-shaped slit, a T-shaped slit, or the like. In the an embodiment of the present disclosure, it is taken as an example that the slit 111 is a rectangular slit, where a length direction of the rectangular slit is a second direction Y, and a width direction of the rectangular slit is a first direction X.

In some examples, referring to FIG. 2, the isolation components 50 are correspondingly arranged not only between the slits 111 adjacent to each other, but also at a position on a side of a first slit 111 of a plurality of slits 111 away from a second slit 111 of the plurality of slits 111, and a position on a side of a last slit 111 of the plurality of slits 111 away from a penultimate slit 111 of the plurality of slits 111, in this case, microwave signal loss at both ends of the radiation layer 11 can be effectively prevented.

Figure 3:
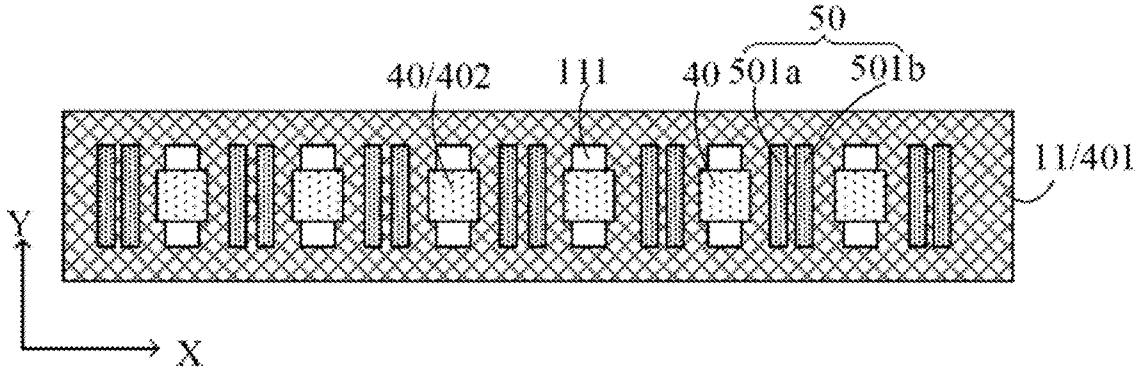
FIG. 3 is a top view of another holographic antenna (a second example) according to an embodiment of the present disclosure.
Figure 5:
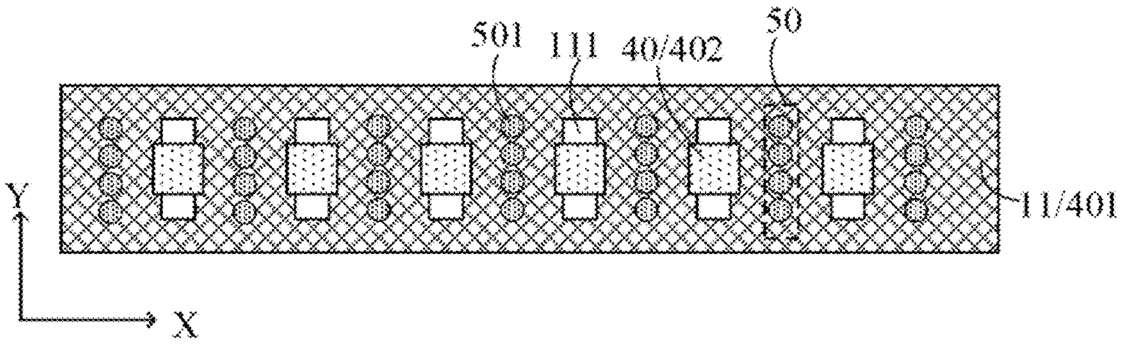
FIG. 5 is a top view of another holographic antenna (a third example) according to an embodiment of the present disclosure.

FIG. 3 is a top view of another holographic antenna according to an embodiment of the present disclosure. In some examples, as shown in FIG. 3, the isolation component 50 may be composed of a plurality of sub-isolators 501 arranged side by side in the first direction X. FIG. 5 is a top view of another holographic antenna according to an embodiment of the present disclosure. As shown in FIG. 5, the isolation component 50 may alternatively be composed of a plurality of sub-isolators 501 arranged at intervals in the second direction Y.

Figure 4:
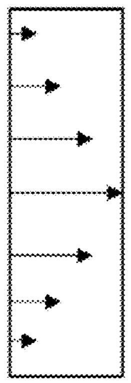
FIG. 4 is diagram illustrating a distribution of an electric field at a position of a slit of a holographic antenna according to an embodiment of the present disclosure.

In a case where the isolation component 50 is composed of a plurality of sub-isolators 501 arranged side by side in the first direction X, a length direction of each of the plurality of sub-isolators 501 may be the same as the length direction of the slit 111, that is, the sub-isolators 501 each extend in the second direction Y. The reason for all the above arrangements is that due to a distribution of the electric field at both sides of the slit 111 in the length direction as shown in FIG. 4, the arrangement can well isolate the adjacent antenna units, thereby reducing the mutual coupling. Furthermore, the mutual coupling can be reduced even better in a case where the isolation component 50 is composed of a plurality of sub-isolators 501 arranged side by side in the first direction X. In the embodiment of the present disclosure, it is taken as an example that the isolation component includes two sub-isolators 501.

In a case where the isolation component 50 is composed of a plurality of sub-isolators 501 arranged side by side in the second direction Y, the sub-isolators 501 may each employ a metal pillar. The sub-isolators 501 adjacent to each other may have a second distance S therebetween, where S is less than or equal to 0.2 wavelength, in this case, the isolation component 50 formed by the sub-isolators 501 is equivalent to a metal strip, and can realize the isolation of the electromagnetic wave.

In some examples, the isolation component 50 may be of a straight line type, in which case the orthographic projection of the isolation component 50 on the first dielectric substrate 10 is a rectangle. Alternatively, the isolation component 50 may be of an irregular shape, in which case the orthographic projection of the isolation component 50 on the first dielectric substrate 10 has a first edge near the second pattern, where the first edge may be an arc, or a polyline.

In some examples, the first dielectric substrate 10 and the second dielectric substrate 30 may be glass-based, or may be of PCB, PET, and polymer low-loss dielectric materials.

In some examples, the material of the radiation layer 11 and the isolation component 50 is a metal material, including but not limited to copper.

In order to make clearer the specific structure and position of the holographic antenna and the isolation component 50 in the holographic antenna according to the embodiment of the present disclosure, the following description is made with reference to specific examples.

A first example is as follows. As shown in FIGS. 1 and 2, the holographic antenna includes a first dielectric substrate 10, a second dielectric substrate 30, a waveguide structure 20, a radiation layer 11, a plurality of switch units 40, a plurality of isolation components 50, and a plurality of support components 60. The first dielectric substrate 10 is arranged on a waveguide port of the waveguide structure 20, the radiation layer 11 is arranged on a side of the first dielectric substrate 10 away from the waveguide structure 20, the second dielectric substrate 30 is arranged on a side of the first radiation layer 11 away from the first dielectric substrate 10, with a certain interval between the second dielectric substrate 30 and the radiation layer 11, and the plurality of switch units 40, the plurality of isolation components 50, and the plurality of support components 60 are arranged between the second dielectric substrate 30 and the radiation layer 11.

In this example, the plurality of slits 111 in the radiation layer 11 may be arranged side by side in the first direction X, and the switch units 40 are arranged in one-to-one correspondence with the slits 111. The switch unit 40 is a liquid crystal switch, and includes a first electrode 401 arranged on the first dielectric substrate 10, a second electrode 402 arranged on the second dielectric substrate 30, and a liquid crystal layer 403 arranged between the first electrode 401 and the second electrode 402. In one example, the radiation layer 11 may also serve as the first electrode 401 of the liquid crystal switch. In one example, the liquid crystal layer 403 of each switch unit 40 is common shared, that is, the liquid crystal layers 403 of all switch units 40 are connected into a one-piece structure. An orthographic projection of the second electrode 402 of each switch unit 40 on the first dielectric substrate 10 overlaps an orthographic projection of the slit 111 corresponding to the second electrode 402 on the first dielectric substrate 10. The isolation components 50 are arranged on the second dielectric substrate 30, in the same layer as the second electrode 402, and in one-to-one correspondence with the support components 60. The support component 60 is located on a side of the isolation component 50 corresponding to the support component away from the second dielectric substrate 30, and abuts against the radiation layer 11. An orthographic projection of the isolation component 50 on the first dielectric substrate 10 is a first pattern, and an orthographic projection of the slit 111 on the first dielectric substrate 10 is a second pattern: at least one first pattern is arranged between two adjacent second patterns, and a first distance is arranged between the second pattern and the first pattern closest to the second pattern. That is, at least one isolation component 50 is arranged at a position between the slits 111 adjacent to each other.

It should be noted that, in a case where the support component 60 is arranged on a side of the corresponding isolation component 50 away from the second dielectric substrate 30, an area of an orthographic projection of the support component 60 on the second dielectric substrate 30 is less than an area of an orthographic projection of the corresponding isolation component 50 on the second dielectric substrate 30. In this case, forming the support component 60 on the isolation component 50 is facilitated, and the isolation component 50 and the support component 60 can be ensured to be in stable contact, to maintain a cell thickness between the first dielectric substrate 10 and the second dielectric substrate 30.

In this example, the isolation component 50 is arranged not only at a position corresponding to the slits 111 adjacent to each other, but also at a position on a side of a first slit 111 of a plurality of slits 111 away from a second slit 111 of the plurality of slits 111, and at a position on a side of a last slit 111 of the plurality of slits 111 away from a penultimate slit 111 of the plurality of slits 111. That is, in this example, the orthographic projections of the isolation components 50 and the slits 111 on the first dielectric substrate 10, that is, the first patterns and the second patterns, are alternately arranged.

In some examples, the support component 60 may be made of conductive adhesive, and the isolation component 50 is arranged on a side of the support component 60 close to the second dielectric substrate 30, so as to greatly reduce mutual coupling between adjacent antenna units.

A second example is as follows. As shown in FIG. 3, the holographic antenna in this example is substantially the same in structure as the first example, except for the specific structure of the isolation component 50. In this example, each isolation component 50 includes two sub-isolators 501, that is, a first sub-isolator 501*a* and a second sub-isolator 501*b*, arranged on a side of the second dielectric substrate 30 close to the radiation layer 11. The support component 60 may be arranged on a side of each of the first sub-isolator 501*a* and the second sub-isolator 501*b* away from the second dielectric substrate 30.

Alternatively, the first isolation sub-component 50 and the second isolation sub-component 50 may each abut against the radiation layer 11. In this case, it may be not be required to arrange the support component 60. Alternatively, the support component 60 may be arranged between the first sub-isolator 501*a* and the second sub-isolator 501*b* of the isolation component 50.

A third example is as follows. As shown in FIG. 5, the holographic antenna in this example is substantially the same in structure as the first example, except for the specific structure of the isolation component 50. In this example, each isolation component 50 includes a plurality of sub-isolators 501 arranged side by side in the second direction Y on a side of the second dielectric substrate 30 close to the radiation layer 11. For example, the sub-isolators 501 may each employ a metal pillar. The sub-isolators 501 adjacent to each other may have a second distance S therebetween, where S is less than or equal to 0.2 wavelength, in this case, the isolation component 50 formed by the sub-isolators 501 is equivalent to a metal strip, and can realize the isolation of the electromagnetic wave.

Figure 6:
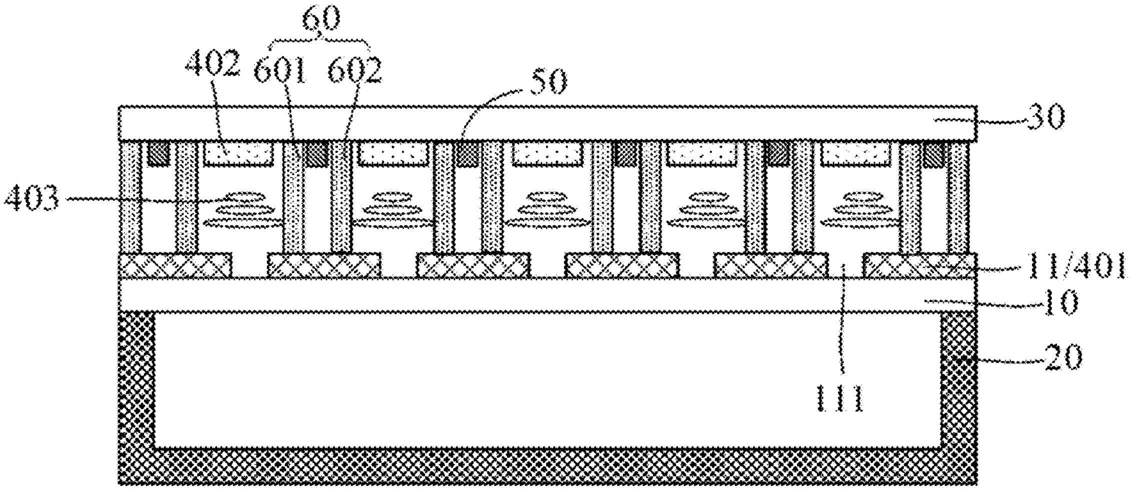
FIG. 6 is a top view of a holographic antenna in a fourth example according to an embodiment of the present disclosure.

A fourth example is as follows. FIG. 6 is a top view of a holographic antenna of a fourth example according to an embodiment of the present disclosure: as shown in FIG. 6, the holographic antenna in this example is substantially the same in structure as the first example, except for the structure of the support component 60 and the position where the isolation component 50 is arranged. In this example, an orthographic projection of the support component 60 on the first dielectric substrate 10 is a third pattern, which is alternately arranged with a second pattern, i.e., an orthographic projection of the slit 111 on the first dielectric substrate 10. For any one support component 60, the support component 60 may include a first sub-support 601 and a second sub-support 602, which are arranged side by side in the first direction X. The isolation component 50 is arranged between the first sub-support 601 and the second sub-support 602, and the isolation component 50 may be arranged on the second dielectric substrate 30, and arranged in the same layer and made of the same material as the second electrode 402 on the second substrate.

With continued reference to FIG. 6, in this example, orthographic projections of the first sub-support 601 and the second sub-support 602 on the first dielectric substrate 10 do not overlap an orthographic projection of the second electrode 402 on the first dielectric substrate 10.

A fifth example is as follows. This example differs from the first example in the number and specific shape of the isolation components 50. In this example, the isolation components 50 are arranged on both sides of any one of the slits 111 extending in the second direction Y.

Figure 7:
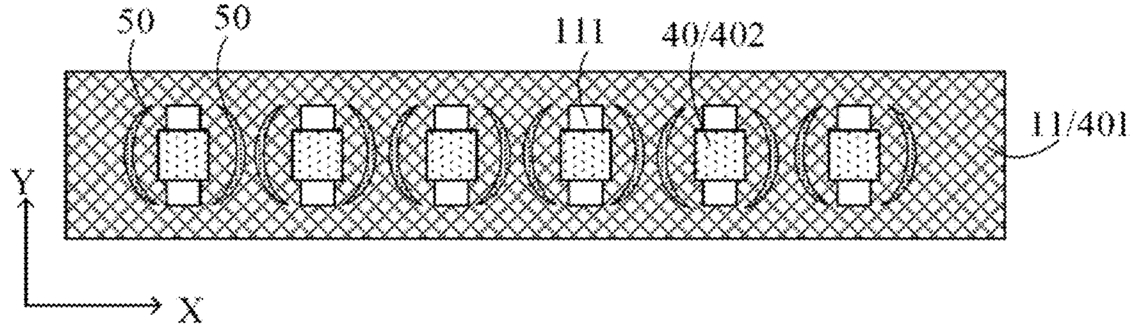
FIG. 7 is a top view of a holographic antenna in a first case of a fifth example according to an embodiment of the present disclosure.

FIG. 7 is a top view of a holographic antenna in a first case of a fifth example according to an embodiment of the present disclosure. In the first case, as shown in FIG. 7, for any one slit 111, an orthographic projection of the slit 111 on the first dielectric substrate 10 is a second pattern, and orthographic projections of the isolation components 50 arranged at the corresponding positions on two sides of the slit 111 extending in the second direction Y, on the first dielectric substrate 10 are two first patterns, which, for convenience of distinction, are referred to as a first isolation pattern and a second isolation pattern, respectively. For any one second pattern, the first isolation pattern is provided with a first edge opposite to the second pattern, and the second isolation pattern is provided with a second edge opposite to the second pattern; the closer a position on the first edge is to the midpoint of the first edge, the greater a distance between the position and the second pattern is: the closer a position on the second edge is to the midpoint of the second edge, the greater a distance between the position and the second pattern is. The reason for this arrangement is to that, as shown in FIG. 4, the distribution of electric field at both sides of the slit 111 in the length direction results in relatively strong electric field intensity at the middle position and relatively weak electric field intensity at both sides, and the arrangement adopting the above structure can well isolate the adjacent antenna units, thereby reducing the mutual coupling between the adjacent antenna units. For example, the first edge of the first isolation pattern and the second edge of the second isolation pattern are both arcs.

Furthermore, the isolation component 50 has a first edge closer to the second pattern, and the first edge is an arc. For example, the isolation component may be of a crescent shape.

In this case, for any one of the second patterns, the two first patterns on both sides of the second pattern extending in the second direction Y are symmetrical to each other, taking a straight line passing through the center of the second pattern and extending in the second direction Y as a symmetry axis.

Figure 8:
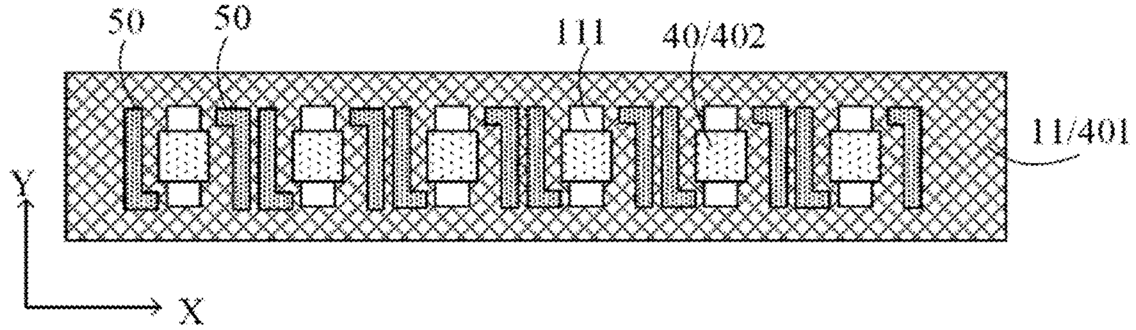
FIG. 8 is a top view of a holographic antenna in a second case of the fifth example according to an embodiment of the present disclosure.

FIG. 8 is a top view of a holographic antenna in a second case of the fifth example according to an embodiment of the present disclosure. In the second case, as shown in FIG. 8, for any one slit 111, an orthographic projection of the slit 111 on the first dielectric substrate 10 is a second pattern, and orthographic projections of the isolation components 50 arranged at the corresponding positions on the two sides of the slit 111 extending in the second direction Y, on the first dielectric substrate 10 are two first patterns, which, for convenience of distinction, are referred to as a first isolation pattern and a second isolation pattern, respectively. The first isolation pattern and the second isolation pattern may each have a first part and a second part: the first part extends in the second direction Y, and the second part is connected to one end of the first part and directed toward the second pattern. For example, the first part and the second part are connected together to form a right-angle structure.

In this case, for any one of the second patterns, two first patterns on both sides of the second pattern extending in the second direction Y are centro-symmetrical to each other, taking the center of the second pattern as a rotation center.

Figure 9:
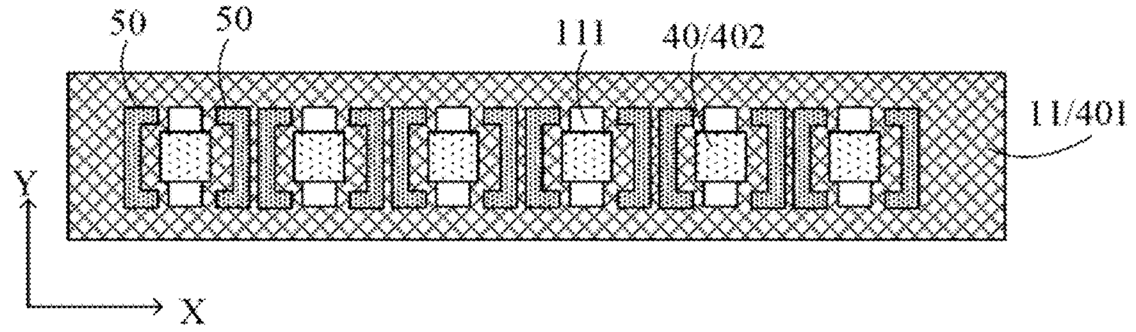
FIG. 9 is a top view of a holographic antenna in a third case of the fifth example according to an embodiment of the present disclosure.

FIG. 9 is a top view of a holographic antenna in a third case of the fifth example according to an embodiment of the present disclosure. In the third case, as shown in FIG. 9, for any one slit 111, an orthographic projection of the slit 111 on the first dielectric substrate 10 is a second pattern, and orthographic projections of the isolation components 50, arranged at the corresponding positions on the two sides of the slit 111 extending in the second direction Y, on the first dielectric substrate 10 are two first patterns, which, for convenience of distinction, are referred to as a first isolation pattern and a second isolation pattern, respectively. The first isolation pattern and the second isolation pattern each are provided with a first edge close to the second pattern, and the first edge is a polyline. For example, the first isolation pattern and the second isolation pattern may each have a first part, a second part, and a third part: the first part extends in the second direction Y, and the second part and the third part are respectively connected to two ends of the first part and point to the second pattern. For example, the first part and the second part are connected together to form a right-angle structure, and the first part and the third part are connected together to form a right-angle structure.

In this case, for any one of the second patterns, two first patterns on both sides of the second pattern extending in the second direction Y are symmetrical to each other, taking a straight line passing through the center of the second pattern and extending in the second direction Y as a symmetry axis. Regardless of whether the holographic antenna according to an embodiment of the present disclosure employs any one of the above structures, the holographic antenna may further include a feeding structure configured to feed a microwave signal into the waveguide structure 20. For example, the feeding structure includes a coaxial probe including, but not limited to, SMA.

In a second aspect, an embodiment of the present disclosure provides an electronic device, which may include any one holographic antenna described above. The antenna further includes a transceiving unit, a radio frequency transceiver, a signal amplifier, a power amplifier, and a filtering unit. The antenna may be used as a transmitting antenna or as a receiving antenna. The transceiving unit may include a baseband and a receiving terminal, where the baseband provides a signal of at least one frequency band, for example, provides a 2G signal, a 3G signal, a 4G signal, a 5G signal, or the like, and transmits the signal of at least one frequency band to the radio frequency transceiver. After receiving a signal, the transparent antenna in the communication system may transmit the signal to a receiving terminal in the transceiving unit after the signal is processed by the filtering unit, the power amplifier, the signal amplifier, and the radio frequency transceiver (not shown in the figure), where the receiving terminal may be, for example, an intelligent gateway.

Furthermore, the radio frequency transceiver is connected to the transceiving unit and is used for modulating the signals transmitted by the transceiving unit or for demodulating the signals received by the transparent antenna and then transmitting the signals to the transceiving unit. Specifically, the radio frequency transceiver may include a transmitting circuit, a receiving circuit, a modulating circuit, and a demodulating circuit. After the transmitting circuit receives various types of signals provided by the baseband, the modulating circuit may modulate the various types of signals provided by the baseband, and then transmit the modulated signals to the antenna. The transparent antenna receives the signal and transmits the signal to the receiving circuit of the radio frequency transceiver, the receiving circuit transmits the signal to the demodulating circuit, and the demodulating circuit demodulates the signal and transmits the demodulated signal to the receiving terminal.

Furthermore, the radio frequency transceiver is connected to the signal amplifier and the power amplifier, the signal amplifier and the power amplifier are further connected to the filtering unit, and the filtering unit is connected to at least one antenna. In the process of transmitting a signal by the communication system, the signal amplifier is used for improving a signal-to-noise ratio of the signal output by the radio frequency transceiver and then transmitting the signal to the filtering unit: the power amplifier is used for amplifying a power of the signal output by the radio frequency transceiver and then transmitting the signal to the filtering unit: the filtering unit specifically includes a duplexer and a filtering circuit, the filtering unit combines signals output by the signal amplifier and the power amplifier into a signal and filters out noise waves and then transmits the signal to the transparent antenna, and the antenna radiates the signal. In the process of receiving a signal by the antenna system, the antenna receives the a signal and then transmits the signal to the filtering unit, the filtering unit filters out noise waves in the signal received by the antenna and then transmits the signal to the signal amplifier and the power amplifier, and the signal amplifier gains the signal received by the antenna and increases the signal-to-noise ratio of the signal: the power amplifier amplifies a power of the signal received by the antenna. The signal received by the antenna is processed by the power amplifier and the signal amplifier and then transmitted to the radio frequency transceiver, and the radio frequency transceiver transmits the signal to the transceiving unit.

In some examples, the signal amplifier may include various types of signal amplifiers, such as a low noise amplifier, which is not limited herein.

In some examples, the antenna according to an embodiment of the present disclosure further includes a power management unit, connected to the power amplifier, for providing the power amplifier with a voltage for amplifying the signal.

It will be understood that the above embodiments are merely exemplary embodiments adopted to illustrate the principles of the present disclosure, and the present disclosure is not limited thereto. It will be apparent to one of ordinary skill in the art that various changes and modifications can be made without departing from the spirit and essence of the present disclosure, and these changes and modifications are to be considered within the scope of the present disclosure.

What is claimed is:

1. A holographic antenna, comprising a first dielectric substrate, a second dielectric substrate, a waveguide structure, a radiation layer and a plurality of switch units; wherein the first dielectric substrate is on a waveguide port of the waveguide structure; the radiation layer is on a side of the first dielectric substrate away from the waveguide structure, and the radiation layer is provided with a plurality of slits; the second dielectric substrate is on a side of the radiation layer away from the first dielectric substrate; the plurality of switch units are between the second dielectric substrate and the radiation layer, and are in one-to-one correspondence with the plurality of slits;

wherein the holographic antenna further comprises a plurality of isolation components between the second dielectric substrate and the radiation layer; an orthographic projection of each of the plurality of isolation components on the first dielectric substrate is a first pattern, and an orthographic projection of each of the plurality of slits on the first dielectric substrate is a second pattern; at least one of the first patterns is between two of the second patterns adjacent to each other, and a first distance is between the second pattern and the first pattern closest to the second pattern, wherein each of the plurality of slits extends in a second direction, and for any one of the second patterns, two of the first patterns are on both sides of the second pattern extending in the second direction, respectively.

2. The holographic antenna according to claim 1, further comprising a plurality of support components between the second dielectric substrate and the radiation layer; wherein the plurality of support components are in one-to-one correspondence with the plurality of isolation components; and each of the plurality of isolation components is on a side of the support component corresponding to the isolation component, close to the second dielectric substrate.

3. The holographic antenna according to claim 2, wherein the support component comprises a conductive material.

4. The holographic antenna according to claim 1, wherein the plurality of first patterns and the plurality of second patterns alternate with each other.

5. The holographic antenna according to claim 4, wherein the plurality of slits are arranged side by side in a first direction, each of the plurality of isolation components comprises a plurality of sub-isolators arranged side by side and spaced apart from each other in the first direction.

6. The holographic antenna according to claim 5, wherein a length direction of each of the plurality of sub-isolators is the second direction.

7. The holographic antenna according to claim 1, further comprising a plurality of support components between the second dielectric substrate and the radiation layer, wherein each of the plurality of support components comprises a first sub-support and a second sub-support, and the isolation component is between the first sub-support and the second sub-support.

8. The holographic antenna according to claim 1, wherein and each of the plurality of isolation components comprises a plurality of sub-isolators arranged side by side and spaced apart from each other in the second direction.

9. The holographic antenna according to claim 1, wherein, for any one of the second patterns, two of the first patterns at both sides of the second pattern extending in the second direction are a first isolation pattern and a second isolation pattern, respectively; the first isolation pattern has a first edge opposite to the second pattern, the closer a position on the first edge is to a midpoint of the first edge, the greater a distance between the position and the second pattern is; and/or, the second isolation pattern has a second edge opposite to the second pattern, the closer a position on the second edge is to a midpoint of the second edge, the greater a distance between the position and the second pattern is.

10. The holographic antenna according to claim 1, wherein, for any one of the second patterns, two of the first patterns on both sides of the second pattern extending in the second direction are symmetrical to each other, taking a straight line passing through a center of the second pattern and extending in the second direction as a symmetry axis.

11. The holographic antenna according to claim 10, wherein the two of the first patterns each have a first edge opposite to the second pattern, and the first edge is an arc or a polyline.

12. The holographic antenna according to claim 1, wherein for any one of the second patterns, two of the first patterns on both sides of the second pattern extending in the second direction are centro-symmetrical to each other, taking a center of the second pattern as a rotation center.

13. The holographic antenna according to claim 12, wherein the two of the first patterns each have a first part and a second part; the first part extends in the second direction, and the second part is connected to one end of the first part and directed toward the second pattern.

14. The holographic antenna according to claim 1, wherein each of the plurality of switch units comprises a first electrode on a side of the first dielectric substrate close to the second dielectric substrate, a second electrode on the second dielectric substrate, and a liquid crystal layer between the first electrode and the second electrode; and the radiation layer also serves as the first electrode; the second electrodes of the plurality of switch units are in one-to-one correspondence with the plurality of slits.

15. The holographic antenna according to claim 14, wherein the switch unit further comprises a control transistor; a drain of the control transistor is electrically connected to the second electrode, a source of the control transistor is electrically connected to a driving voltage line, and a gate of the control transistor is electrically connected to a control line.

16. The holographic antenna according to claim 14, wherein the isolation component is in the same layer as the second electrode.

17. An electronic device, comprising the holographic antenna according to claim 1.

* * * * *